US012129206B2

(12) United States Patent
Pisklak et al.

(10) Patent No.: US 12,129,206 B2
(45) Date of Patent: Oct. 29, 2024

(54) ENHANCED POZZOLAN FOR USING IN EXTENDED LIFE CEMENTS

(71) Applicant: Halliburton Energy Services, Inc., Houston, TX (US)

(72) Inventors: Thomas Jason Pisklak, Houston, TX (US); Claudia Carmen Pineda, Houston, TX (US); Travis Allen Patterson, Houston, TX (US); Samuel Jason Lewis, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 493 days.

(21) Appl. No.: 17/512,314

(22) Filed: Oct. 27, 2021

(65) Prior Publication Data

US 2023/0129356 A1  Apr. 27, 2023

(51) Int. Cl.
*C04B 28/02* (2006.01)
*C04B 24/06* (2006.01)
*C04B 40/06* (2006.01)
*C04B 103/10* (2006.01)
*C04B 103/22* (2006.01)
*C09K 8/467* (2006.01)

(52) U.S. Cl.
CPC .............. *C04B 28/02* (2013.01); *C04B 24/06* (2013.01); *C04B 40/0658* (2013.01); *C09K 8/467* (2013.01); *C04B 2103/10* (2013.01); *C04B 2103/22* (2013.01)

(58) Field of Classification Search
CPC ..... C04B 28/02; C04B 24/06; C04B 40/0658; C04B 2103/10; C04B 2103/22; C09K 8/467
See application file for complete search history.

(56) References Cited

U.S. PATENT DOCUMENTS

| | | | |
|---|---|---|---|
| 8,851,173 B2 | 10/2014 | Brothers et al. | |
| 10,961,428 B1 | 3/2021 | Pisklak et al. | |
| 2014/0202698 A1* | 7/2014 | Pisklak | C04B 28/10 |
| | | | 166/292 |
| 2016/0222276 A1* | 8/2016 | Agapiou | C09K 8/473 |
| 2017/0002257 A1* | 1/2017 | Pisklak | C04B 28/34 |
| | | | 166/292 |
| 2020/0317571 A1* | 10/2020 | MacDonald | C04B 18/0481 |

* cited by examiner

*Primary Examiner* — Crystal J Lee
(74) *Attorney, Agent, or Firm* — Thomas Rooney; C. Tumey Law Group PLLC

(57) ABSTRACT

Cementing in a subterranean formation may include, activating an extended-life cement composition by mixing at least the extended-life cement composition with a liquid activated pozzolan additive comprising a carrier fluid and an activated pozzolan, wherein the extended-life cement composition comprises water, pumice, hydrated lime, and a set retarder; introducing the extended-life cement composition into a subterranean formation; and allowing the extended-life cement composition to set to form a hardened mass in the subterranean formation.

20 Claims, 2 Drawing Sheets

ENHANCED POZZOLAN FOR USING IN EXTENDED LIFE CEMENTS

BACKGROUND

Embodiments relate to subterranean cementing operations and, in certain embodiments, to extended-life cement compositions and methods of using extended-life cement compositions in subterranean formations.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, extended-life cement compositions have been used. Extended-life cement compositions are characterized by remaining in a pumpable fluid state for at least about one day (e.g., at least about 7 days, about 2 weeks, about 2 years or more) at room temperature (e.g., about 80° F.) in quiescent storage. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, Recommended Practice for Testing Well Cements, First Edition, July 2005. When desired for use, the extended-life cement compositions should be capable of being activated by a liquid activated pozzolan additive whereby reasonable compressive strengths are developed. For example, a liquid activated pozzolan additive may be added to an extended-life cement composition whereby the composition sets into a hardened mass. Among other things, the extended-life cement composition may be suitable for use in wellbore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for offshore cementing operations where space onboard the vessels may be limited.

While extended-life cement compositions have been developed heretofore, challenges exist with their successful use in subterranean cementing operations. For example, extended-life cement compositions may benefit from an increase in compressive strength development. Specifically, boosts to early strength development as well as long term strength development would provide compositions capable of a being used in a broader variety of operations as compared to compositions that develop compressive strength slower or do not develop as much long-term strength.

BRIEF DESCRIPTION OF THE DRAWINGS

These drawings illustrate certain aspects of some of the embodiments of the present method and should not be used to limit or define the method.

DETAILED DESCRIPTION

Figure 1:
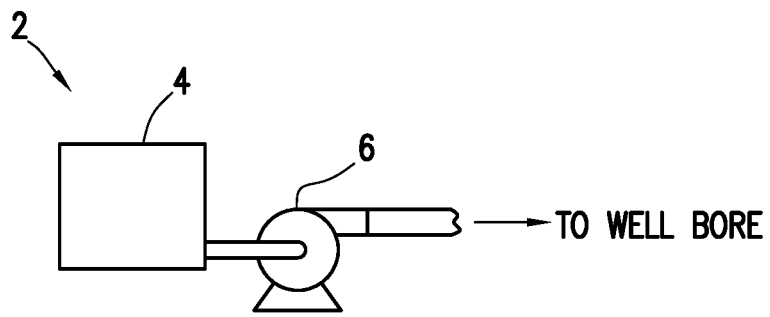
FIG. 1 illustrates a system for the preparation and delivery of an extended-life cement composition to a wellbore in accordance with certain embodiments.

The present disclosure may generally relate to cementing methods and systems. More particularly, embodiments may be directed compositions and methods of cementing using extended-life cement compositions comprising an activated pozzolan. The activated pozzolan may be utilized in preparation of extended-life cement composition as a pozzolan source. Methods disclosed herein may be utilized to enhance pozzolanic activity of relatively inert pozzolans, low reactivity pozzolans, mid reactivity pozzolans, and high reactivity pozzolans to form activated pozzolan. Activated pozzolans may have several advantages over the raw pozzolans the activated pozzolans are derived from. For example, some raw pozzolans may not be reactive enough to produce an extended-life cement composition with the required properties such as compressive strength. Activated pozzolans have higher reactivity than the corresponding raw pozzolan thereby extending the number of materials that are available to formulate an extended-life cement composition. Activated pozzolans may also enhance mechanical properties of extended-life cement compositions such as compressive strength, especially at relatively lower temperature such as 140° F. (60° C.) or below.

As used herein, activated pozzolan refers to a raw pozzolanic material which has been surface modified by reacting the raw pozzolanic material in a passivated cement solution. The activated pozzolan may be provided as a liquid suspension referred to as liquid activated pozzolan additive or may be a dried product from the surface modifying reaction.

The passivated cement solution may impart several properties to the surface of the raw pozzolanic material to form the activated pozzolan, including without limitation, surface etching, formation of microcrystalline calcium silica hydrate on the surface, dissolution of silicates to form more reactive silicate species, and others. The activated pozzolan has greater reactivity than the raw pozzolanic material the activated pozzolan is derived from thereby allowing the activated pozzolan to be utilized in a wider variety of cement designs than the corresponding raw pozzolanic material. The process described herein may be utilized to upgrade relatively lower reactivity pozzolans to relatively higher reactivity pozzolans thereby increasing the value of the lower reactivity pozzolan. Liquid activated pozzolan additive may be used in preparing wellbore cement slurries where a cement dry blend, water, and the liquid activated pozzolan additive may be mixed to form a wellbore cement slurry. Cement dry blends may be prepared in bulk blending facilities where a cement, such as Portland cement, may be mixed with additives such as supplementary cementitious materials, chemical additives, and inert additives, for example. While there are many advantages to including the activated pozzolan in a wellbore cement slurry, a particular advantage may be reduction in greenhouse gas emissions as a portion of the cement may be replaced by activated pozzolan. Another advantage is that the mechanical properties of a set cement, such as compressive strength and Young's modulus, are increased by including the activated pozzolan as compared to a cement containing the raw pozzolanic material.

Pozzolans are typically classified as materials containing siliceous and/or aluminous materials which react with water and calcium hydroxide to form a set cement. Any suitable raw pozzolan may be utilized in the present application to produce activated pozzolan, including for example, fly ash, volcanic ash, tuft, pumicites, clays such as metakaolin, silica fume, slag, lime ash, perlite, and glass such as silicate glass, soda-lime glass, soda-silica glass, borosilicate glass, and aluminosilicate glass. While the present list is of suitable raw pozzolans is non-exhaustive, it is believed that any pozzolan suitable for use in an oilwell cement is also suitable for the processes described herein to produce activated pozzolan. The raw pozzolan may have any particle size distribution and morphology. In certain embodiments, the pumice may have a d50 particle size distribution in a range of from about 1 micron to about 200 microns, or greater. The d50 values may be measured by particle size analyzers such as those manufactured by Malvern Instruments, Worcestershire, United Kingdom. In specific embodiments, the raw pozzolan may have a d50 particle size distribution in a range of from about 1 micron to about 200 microns, from about 5 microns to about 100 microns, or from about 10 microns to about 25 microns.

Preparing the activated pozzolan comprises preparing a passivated cement solution. A passivated cement solution is a solution which contains cement and water in an amount such that the passivated cement solution does not set to form a hardened mass at 20° C. and 101.325 kPa when tested in a ultrasonic cement analyzer, operated in accordance with the procedure set forth in the aforementioned API RP Practice 10B-2. In wellbore cementing, water is added to a dry cement in an amount to produce a cement slurry with a desired density and in an amount such that the cement slurry will set to form a hardened mass with a desired compressive strength. In wellbore cementing, density is an important property when the cement is being pumped into the wellbore to ensure that sufficient pressure is exerted by the cement slurry and the well remains controlled. When the cement slurry sets, the compressive strength is an important property to ensure zonal isolation does not become compromised. Thus, there is a minimum amount of water to include which begins to hydrate cement grains and maximum practical amount of water that would be added to a dry cement blend when preparing a cement slurry for wellbore use to meet density and compressive strength requirement, among others. As more water is added to a cement slurry beyond what is required to hydrate the individual grains of cement, the cement grains begin to disperse in solution. The dispersive effects lower the inter-grain formation of cement hydration products thereby reducing the compressive strength of the set cement until there is enough water to separate the grains such that the solution does not set to form a hardened mass.

The passivated cement solutions of the present application are distinct from cement slurries prepared for use in wellbore or construction applications as the passivated cement solution contains water in an amount which prevents the passivated cement solution from setting to form a hardened mass. Cement slurries prepared for wellbore and construction cementing contain water in amounts that allow the cement slurry to set to form a hardened mass. In some examples, passivated cement solution may have a density close to that of water (1 kg/l). For example, the passivated cement solution may have a density from about 1 kg/l to about 1.2 kg/l. However, density of the passivated cement solution is dependent upon the amount of water required to form a solution which does not set to form a hardened mass. The amount of water required to form a solution that does not set may vary greatly between cements. While low density cements slurries do exist which have lower density than water, these cements slurries are usually formulated with light weight beads or a foaming surfactant and foaming gas which reduces the density below that of water. However, low density cements slurries still contain water in amounts that allow the cement to set to form a hardened mass and are distinct from the passivated cement solution which does not set.

Thickening time typically refers to the time a fluid, such as a cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In wellbore cementing, 70 Bc (Beardan units of consistency) is used as a cutoff for when a cement is considered too set to pump. The passivated cement solution as disclosed herein does not reach 70 Bc as the passivated cement solution does not set to form a hardened mass.

To form the passivated cement solution, water may be combined with a cement in an amount such that the cement grains are diluted and not capable of agglomerating to form a hardened mass. The amount of water required to prepare a passivated cement solution may depend on the type and origin of the cement used as cements may vary in the amount of water required to hydrate the cement grains. A wide variety of cements may be used to prepare the passivated cement solution such as, without limitation, Portland cements, pozzolana cements, gypsum cements, alumina cements, silica cements, and any combination thereof. The amount of water should be sufficient to dilute the water and cement mixture enough so that the particles of the cement material generally do not agglomerate and bind to each other, i.e. they remain discrete. An abundance of water should be used such that the particles of the cementitious material are not capable of agglomerating, for example the water may be used in an amount of about 400% by weight of the cementitious material to about 5000% by weight of the cementitious material or more. Alternatively, the water may be used in an amount of about 400% by weight of the cementitious material to about 1000% by weight of the cementitious material, about 1000% by weight of the cementitious material to about 2500% by weight of the cementitious material, about 2500% by weight of the cementitious material to about 5000% by weight of the cementitious material, or any ranges therebetween. In the Examples below, the water is present in about 1000% by weight of water.

The water may be provided in an amount such that particles of the cement material are able to not agglomerate. Agglomerated particles may be broken by shearing and suspension aids may be used to keep the particles from settling. After the water has been added to the cement the passivation process will commence. The mixture may need to react for a period, for example, of about 1 hours to about 24 hours. Alternatively, the mixture may be reacted for about 1 hour to about 2 hours, about 2 hours to about 5 hours, or about 5 hours to about 12 hours, or about 12 hours to about 24 hours, or any ranges therebetween for example. The passivation process may be carried out at any temperature, for example temperatures ranging from about 5° C. to about 80° C. Alternatively, from about 5° C. to about 20° C., about 20° C. to about 60° C., about 60° C. to about 80° C., or any ranges therebetween. During the reaction phase, the mixture may to be stirred either continuously or intermittently or may be kept in a quiescent state. Any type of stirring or agitation may be used including magnetic stirrers and overhead stirrers for example. Additionally, a suspension agent, may be used to aid in suspending the cement particles. Use of the suspending agent may be in addition to or in substitution of agitation. Examples of suitable suspending aids may include viscosifiers, such as those described above which include swellable clays such as bentonite or biopolymers such as cellulose derivatives (e.g., hydroxyethyl cellulose, carboxymethyl cellulose, carboxymethyl hydroxyethyl cellulose). The passivation process may include many individual cementitious reactions, the cement hydration products of which may depend on the particular cement selected. With Portland cement, some cement hydration products may include a mixture of partially and fully reacted cement grains, C—S—H (calcium silicate hydrate) micro and/or nanoparticles, and a solution pH of greater than 7.

Once the passivated cement solution is prepared, a suitable raw pozzolan is added to the passivated cement solution. Raw pozzolans may include any described above, including but not limited to fly ash, volcanic ash, tuff, pumicites, clays such as metakaolin, silica fume, slag, lime ash, perlite, and glass such as silicate glass, soda-lime glass, soda-silica glass, borosilicate glass, and aluminosilicate glass. The raw pozzolan may be added in any suitable amount including from about 100% by weight of cement in the passivated cement solution to about 2000% by weight of cement in the passivated cement solution. Alternatively, from about 100% by weight of cement in the passivated cement solution to about 500% by weight of cement in the passivated cement solution, from about 500% by weight of cement in the passivated cement solution to about 1000% by weight of cement in the passivated cement solution, from about 1000% by weight of cement in the passivated cement solution to about 2000% by weight of cement in the passivated cement solution, or any ranges therebetween. Once the raw pozzolans are added to the passivated cement solution, the cement hydration products in the passivated cement solution begin to react with the raw pozzolan to produce activated pozzolan.

The mixture may need to react for a period, for example, of about 1 hours to about 24 hours. Alternatively, the mixture may be reacted for about 1 hour to about 2 hours, about 2 hours to about 5 hours, or about 5 hours to about 12 hours, about 12 hours to about 24 hours, or any ranges therebetween for example. The reaction may be carried out at any temperature, for example temperatures ranging from about 5° C. to about 80° C. Alternatively, from about 5° C. to about 20° C., about 20° C. to about 60° C., about 60° C. to about 80° C., or any ranges therebetween. During the activation reaction phase, the mixture may to be stirred either continuously or intermittently or may be kept in a quiescent state. Additionally, a suspension agent may be used to aid in suspending the raw pozzolan. Use of the suspending agent may be in addition to or in substitution of agitation. Examples of suitable suspending aids may include viscosifiers, such as those described above which include swellable clays such as bentonite or biopolymers such as cellulose derivatives (e.g., hydroxyethyl cellulose, carboxymethyl cellulose, carboxymethyl hydroxyethyl cellulose).

Activated pozzolan may undergo surface reactions in the passivated cement solution. Without being limited by theory, it is believed the passivated cement solution deposits calcium silicate hydrates and carbonates on the surface of the raw pozzolan which increases the reactivity of the raw pozzolan. The passivated cement solution may etch and dissolve the surface of the raw pozzolan to create soluble species and induce formation of nucleation sites on the raw pozzolan.

The product mixture from the activation reaction, referred to as liquid activated pozzolan additive, may include unreacted passivated cement solution, unreacted pozzolan, activated pozzolan, and water. The liquid activated pozzolan additive may be used as a liquid additive for cementing where it may be used as a pozzolan source. In some embodiments, the volume of the liquid activated pozzolan additive may be reduced to concentrate the liquid activated pozzolan additive.

In some embodiments, the liquid activated pozzolan additive may be dried to leave a dry activated pozzolan. A dry activated pozzolan may be mixed with a carrier fluid to produce a liquid activated pozzolan additive. For example, the dry activated pozzolan may be mixed with an aqueous or non-aqueous carrier fluid. A non-aqueous carrier fluid may include oleaginous-based fluids such as α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and combinations thereof. A suspension aid may be used to disperse the dry activated pozzolan in the carrier fluid. Additionally, the dried activated pozzolan may be included in a cement dry blend which may be mixed with water to form the extended-life cement composition. Cement dry blends may be prepared in bulk blending facilities where a cement, such as Portland cement, may be mixed with additives such as supplementary cementitious materials, chemical additives, inert additives, and the activated pozzolan.

Embodiments of the extended-life cement compositions may generally comprise water, a pozzolan, hydrated lime, and a set retarder. Pozzolans may include any of the pozzolans previously discussed, including activated pozzolans. Optionally, the extended-life cement compositions may further comprise a dispersant, slag, cement kiln dust, amorphous silica, a pozzolan, and/or a cement set activator. Embodiments of the extended-life cement compositions may be foamed. Advantageously, embodiments of the extended-life cement compositions may be capable of remaining in a pumpable fluid state for an extended period of time. For example, the extended-life cement compositions may remain in a pumpable fluid state for at least about 1 day, about 2 weeks, about 2 years, or longer. Advantageously, the extended-life cement compositions may develop reasonable compressive strengths after activation with a liquid activated pozzolan additive at relatively low temperatures. While the extended-life cement compositions may be suitable for a number of subterranean cementing operations, they may be particularly suitable for use in subterranean formations having relatively low bottom hole static temperatures, e.g., temperatures less than about 200° F. (93.3° C.) or ranging from about 100° F. (37.7° C.) to about 200° F. (93.3° C.). In alternative embodiments, the extended-life cement compositions may be used in subterranean formations having bottom hole static temperatures up to 450° F. (232° C.) or higher.

The water may be from any source provided that it does not contain an excess of compounds that may undesirably affect other components in the extended-life cement compositions. For example, an extended-life cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the extended-life cement composition in an amount in the range of from about 33% to about 200% by weight of the pozzolan. In certain embodiments, the water may be present in the extended-life cement compositions in an amount in the range of from about 35% to about 70% by weight of the pozzolan.

Pumice may be present in the extended-life cement compositions. Generally, pumice is a volcanic rock that can exhibit cementitious properties in that it may set and harden in the presence of hydrated lime and water. The pumice may also be ground. Generally, the pumice may have any particle size distribution as desired for a particular application. In certain embodiments, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the pumice may have a mean particle size in a range of from about 1 micron to about 200 microns, from about 5 microns to about 100 microns, or from about 10 microns to about 50 microns. In one particular embodiment, the pumice may have a mean particle size of less than about 15 microns.

Hydrated lime may be present in the extended-life cement compositions. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in embodiments of the extended-life cement compositions, for example, to form a hydraulic composition with the pumice. For example, the hydrated lime may be included in a pumice-to-hydrated-lime weight ratio of about 10:1 to about 1:1 or 3:1 to about 5:1. Where present, the hydrated lime may be included in the extended-life cement compositions in an amount in the range of from about 10% to about 100% by weight of the pozzolan, for example. In some embodiments, the hydrated lime may be present in an amount ranging between any of and/or including any of about 10%, about 20%, about 40%, about 60%, about 80%, or about 100% by weight of the pozzolan. In some embodiments, the cementitious components present in the extended-life cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water.

A set retarder may be present in the extended-life cement compositions. A broad variety of set retarders may be suitable for use in the extended-life cement compositions. For example, the set retarder may comprise phosphonic acids, such as ethylenediamine tetra(methylene phosphonic acid), diethylenetriamine penta(methylene phosphonic acid), etc.: lignosulfonates, such as sodium lignosulfonate, calcium lignosulfonate, etc.: salts such as stannous sulfate, lead acetate, monobasic calcium phosphate, organic acids, such as citric acid, tartaric acid, etc.: cellulose derivatives such as hydroxyl ethyl cellulose (HEC) and carboxymethyl hydroxyethyl cellulose (CMHEC): synthetic co- or terpolymers comprising sulfonate and carboxylic acid groups such as sulfonate-functionalized acrylamide-acrylic acid co-polymers: borate compounds such as alkali borates, sodium metaborate, sodium tetraborate, potassium pentaborate: derivatives thereof, or mixtures thereof. Examples of suitable set retarders include, among others, phosphonic acid derivatives. Generally, the set retarder may be present in the extended-life cement compositions in an amount sufficient to delay the setting for a desired time. In some embodiments, the set retarder may be present in the extended-life cement compositions in an amount in the range of from about 0.01% to about 10% by weight of the pozzolan. In specific embodiments, the set retarder may be present in an amount ranging between any of and/or including any of about 0.01%, about 0.1%, about 1%, about 2%, about 4%, about 6%, about 8%, or about 10% by weight of the pozzolan.

A strength enhancer may be included in the extended-life cement compositions. The strength enhancer may comprise cement kiln dust, slag, or combination thereof. The cement kiln dust or slag may be added to the extended-life cement compositions prior to, concurrently with, or after activation. Cement kiln dust ("CKD") as that term is used herein, refers to a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. Slag as that term is used herein, refers to a granulated, blast furnace by-product formed in the production of various metals from their corresponding ores. By way of example, the production of cast iron can produce slag as a granulated, blast furnace by-product with the slag generally comprising the oxidized impurities found in iron ore. The slag may provide an easily soluble calcium silicate and calcium aluminate source that can aid strength development of the extended-life cement compositions. The strength enhancer may be included in the extended-life cement composition at any suitable time as desired for a particular application. By way of example, the strength enhancer may be included before or after activation of the extended-life cement composition.

The CKD and/or slag may be included in embodiments of the extended-life cement compositions in an amount suitable for a particular application. In some embodiments, the CKD and/or slag may be present in an amount of about 1% to about 400% by weight of the pozzolan, for example, about 1%, about 10%, about 50%, about 100%, about 250%, or about 400%. The CKD and/or slag may be used to enhance the 24-hour compressive strength by about 100% or greater. For example, the CKD or slag may be used to enhance the 24-hour compressive strength by about 100%, about 125%, about 150%, about 200% or more. Further, the CKD and/or slag may be used to enhance the 72-hour compressive strength by about 50% or greater. For example, the CKD or slag may be used to enhance the 72-hour compressive strength by about 50%, about 60%, about 75%, about 100% or more.

As previously mentioned, embodiments of the extended-life cement compositions may optionally comprise a dispersant. Examples of suitable dispersants include, without limitation, sulfonated-formaldehyde-based dispersants (e.g., sulfonated acetone formaldehyde condensate) and polycarboxylated ether dispersants. While a variety of dispersants may be used in accordance with embodiments, polycarboxylated ether dispersants may be particularly suitable for use in some embodiments. Without being limited by theory, it is believed that polycarboxylated ether dispersants may synergistically interact with other components of the extended-life cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the extended-life cement compositions in an amount in the range of from about 0.01% to about 5% by weight of the pumice. In specific embodiments, the dispersant may be present in an amount ranging between any of and/or including any of about 0.01%, about 0.1%, about 0.5%, about 1%, about 2%, about 3%, about 4%, or about 5% by weight of the pozzolan.

Other additives suitable for use in subterranean cementing operations also may be included in embodiments of the extended-life cement compositions. Examples of such additives include, but are not limited to weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the extended-life cement compositions after storing but prior to the placement of an extended-life cement composition into a subterranean formation, result.

The extended-life cement compositions generally should have a density suitable for a particular application. By way of example, the extended-life cement compositions may have a density in the range of from about 4 pounds per gallon ("lb/gal") to about 20 lb/gal. In certain embodiments, the extended-life cement compositions may have a density in the range of from about 8 lb/gal to about 17 lb/gal. Embodiments of the extended-life cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation.

As previously mentioned, the extended-life cement compositions may have a delayed set in that they remain in a pumpable fluid state for at least one day (e.g., at least about 1 day, about 2 weeks, about 2 years or more) at room temperature (e.g., about 80° F.) in quiescent storage. For example, the extended-life cement compositions may remain in a pumpable fluid state for a period of time from about 1 day to about 7 days or more. In some embodiments, the extended-life cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, Recommended Practice for Testing Well Cements, First Edition, July 2005.

When desired for use, embodiments of the extended-life cement compositions may be activated (e.g., by combination with an activator) to set into a hardened mass. The term "cement set activator" or "activator", as used herein, refers to an additive that activates an extended-life cement composition and may also accelerate the setting of the extended-life cement composition. By way of example, embodiments of the extended-life cement compositions may be activated to form a hardened mass in a time period in the range of from about 1 hour to about 12 hours. For example, embodiments of the extended-life cement compositions may set to form a hardened mass in a time period ranging between any of and/or including any of about 1 day, about 2 days, about 4 days, about 6 days, about 8 days, about 10 days, or about 12 days.

In some embodiments, the extended-life cement compositions may set to have a desirable compressive strength after activation. Compressive strength is generally the capacity of a material or structure to withstand axially directed pushing forces. The compressive strength may be measured at a specified time after the extended-life cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, TX. Compressive strength values may be determined in accordance with API RP 10B-2, *Recommended Practice for Testing Well Cements*, First Edition, July 2005.

By way of example, the extended-life cement compositions may develop a 24-hour compressive strength in the range of from about 50 psi to about 5000 psi, alternatively, from about 100 psi to about 4500 psi, or alternatively from about 500 psi to about 4000 psi. In some embodiments, the extended-life cement compositions may develop a compressive strength in 24 hours of at least about 50 psi, at least about 100 psi, at least about 500 psi, or more. In some embodiments, the compressive strength values may be determined using destructive or non-destructive methods at a temperature ranging from 100° F. to 200° F.

In some embodiments, the extended-life cement compositions may have desirable thickening times after activation. Thickening time typically refers to the time a fluid, such as an extended-life cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

Embodiments may include the addition of a cement set activator to the extended-life cement compositions. In some examples, the activator may include a liquid activated pozzolan additive as described above. In other embodiments, the activator may include activated pozzolan provided as a dry powder. Other examples of suitable cement set activators include, but are not limited to: zeolites, amines such as triethanolamine, diethanolamine: silicates such as sodium silicate: zinc formate: calcium acetate: Groups IA and IIA hydroxides such as sodium hydroxide, magnesium hydroxide, and calcium hydroxide; monovalent salts such as sodium chloride; divalent salts such as calcium chloride: nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the extended-life cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the extended-life cement composition as a liquid additive, for example, a liquid additive comprising a monovalent salt, a polyphosphate, and optionally a dispersant.

Some embodiments may include a cement set activator comprising nanosilica. As used herein, the term "nanosilica" refers to silica having a particle size of less than or equal to about 100 nanometers ("nm"). The size of the nanosilica may be measured using any suitable technique. It should be understood that the measured size of the nanosilica may vary based on measurement technique, sample preparation, and sample conditions such as temperature, concentration, etc. One technique for measuring the particle size of the nanosilica is Transmission Electron Microscopy (TEM). An example of a commercially available product based on laser diffraction is the ZETASIZER Nano ZS particle size analyzer supplied by Malvern Instruments. Worcestershire. UK. In some embodiments, the nanosilica may comprise colloidal nanosilica. The nanosilica may be stabilized using any suitable technique. In some embodiments, the nanosilica may be stabilized with a metal oxide, such as lithium oxide, sodium oxide, potassium oxide, and/or a combination thereof. Additionally, the nanosilica may be stabilized with an amine and/or a metal oxide as mentioned above. Embodiments of the nanosilicas have an additional advantage in that they have been known to fill in pore space in cements which can result in superior mechanical properties in the cement after it has set.

Some embodiments may include a cement set activator comprising a combination of a monovalent salt and a polyphosphate. The monovalent salt and the polyphosphate may be combined prior to addition to the extended-life cement composition or may be separately added to the extended-life cement composition. The monovalent salt may be any salt that dissociates to form a monovalent cation, such as sodium and potassium salts. Specific examples of suitable monovalent salts include potassium sulfate and sodium sulfate. A variety of different polyphosphates may be used in combination with the monovalent salt for activation of the extended-life cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. Interestingly, sodium hexametaphosphate is also known in the art to be a strong retarder of Portland cements. Because of the unique chemistry of polyphosphates, polyphosphates may be used as a cement set activator for embodiments of the extended-life cement compositions disclosed herein. The ratio of the monovalent salt to the polyphosphate may range, for example, from about 5:1 to about 1:25 or from about 1:1 to about 1:10. Embodiments of the cement set activator may comprise the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some embodiments, the combination of the monovalent salt and the polyphosphate may be mixed with a dispersant and water to form a liquid additive for activation of a extended-life cement composition. Examples of suitable dispersants include, without limitation, the previously described dispersants, such as sulfonated-formaldehyde-based dispersants and poly carboxylated ether dispersants.

The cement set activator may be added to embodiments of the extended-life cement composition in an amount sufficient to induce the extended-life cement composition to set into a hardened mass. In certain embodiments, the cement set activator may be added to the extended-life cement composition in an amount in the range of about 0.1% to about 20% by weight of the pozzolan. In specific embodiments, the cement set activator may be present in an amount ranging between any of and/or including any of about 0.1%, about 1%, about 5%, about 10%, about 15%, or about 20% by weight of the pozzolan.

Some embodiments of the cement set activator (including a liquid additive cement set activator) may comprise silica sources: for example, amorphous silica and/or a pozzolan for use as a strength enhancer. For example, a cement set activator may comprise calcium chloride and a silica source. The strength enhancers comprising a silica source may be used for enhancing early strength enhancement in a similar manner to the previously described cement kiln dust and/or slag strength enhancers. However, the strength enhancers comprising silica sources may be added to a cement set activator instead of directly to a extended-life cement composition. In some embodiments, adding a strength enhancer comprising a silica source directly to an extended-life cement composition may induce gelation or flash setting. However, embodiments comprising a cement set activator comprising a silica-source strength enhancer may not induce gelation or flash setting.

In embodiments, a strength enhancer comprising a silica source may comprise amorphous silica. Amorphous silica is a powder that may be included in embodiments of the cement set activators to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process.

In embodiments, a strength enhancer comprising a silica source may comprise a pozzolan. Examples of pozzolans include diatomaceous earth, metakaolin, zeolite, fly ash, volcanic ash, opaline shale, tuff, and combinations thereof. Embodiments comprising strength enhancers may utilize the additional silica source as needed to enhance compressive strength.

A variety of fly ashes may be suitable for use as silica sources for embodiments comprising strength enhancers. Fly ash may include fly ash classified as Class C and Class F fly ash according to American Petroleum Institute, API Specification for Materials and Testing for Well Cements, API Specification 10, Fifth Ed., Jul. 1, 1990.

Metakaolin may be suitable for use as a silica source for embodiments comprising strength enhancers. Generally, metakaolin is a white pozzolan that may be prepared by heating kaolin clay to temperatures in the range of about 600° to about 800° C.

Diatomaceous earth may be suitable for use as a silica source for embodiments comprising strength enhancers. Diatomaceous earth is a soft bulky solid material primarily composed of silica. Generally, diatomaceous earth is derived from the fossilized remains of the skeletons of small prehistoric aquatic plants referred to as diatoms. It is generally available as a powder.

Zeolites may be suitable for use as a silica source for embodiments comprising strength enhancers. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

The silica-source strength enhancer may be added to embodiments of the cement set activator in an amount sufficient to increase the compressive strength of an extended-life cement composition. In certain embodiments, the silica source may be added to cement set activator in an amount in the range of about 0.1% to about 20% by weight of the pozzolan. In specific embodiments, the silica-source strength enhancer may be present in the cement set activator in an amount ranging between any of and/or including any of about 0.1%, about 1%, about 5%, about 10%, about 15%, or about 20% by weight of the pozzolan.

Embodiments of the extended-life cement compositions may be used in a variety of subterranean operations, including primary and remedial cementing. In some embodiments, an extended-life cement composition may be provided that comprises water, a pozzolan, hydrated lime, a set retarder, and optionally a dispersant. A strength enhancer may be included in the extended-life cement composition. The extended-life cement composition may be activated by combining with an activator and the activated slurry may be introduced into a subterranean formation and allowed to set therein. As used herein, introducing the extended-life cement composition into a subterranean formation includes introduction into any portion of the subterranean formation, including, without limitation, into a wellbore drilled into the subterranean formation, into a near wellbore region surrounding the wellbore, or into both. Embodiments may further include activation of the extended-life cement composition. The activation of the extended-life cement composition may comprise, for example, the addition of a cement set activator such as a liquid activated pozzolan additive to the extended-life cement composition. A silica-source strength enhancer may be included in the cement set activator.

In some embodiments, an extended-life cement composition may be provided that comprises water, pozzolan, hydrated lime, a set retarder, and optionally a dispersant and/or strength enhancer. The extended-life cement composition may be stored, for example, in a vessel or other suitable container. The extended-life cement composition may be permitted to remain in storage for a desired time period. For example, the extended-life cement composition may remain in storage for a time period of about 1 day or longer. For example, the extended-life cement composition may remain in storage for a time period of about 1 day, about 2 days, about 5 days, about 7 days, about 10 days, about 20 days, about 30 days, about 40 days, about 50 days, about 60 days, or longer. In some embodiments, the extended-life cement composition may remain in storage for a time period in a range of from about 1 day to about 7 days or longer. Thereafter, the extended-life cement composition may be activated, for example, by addition of a cement set activator which may include a liquid activated pozzolan additive, introduced into a subterranean formation, and allowed to set therein.

In primary cementing embodiments, for example, the extended-life cement composition may be introduced into an annular space between a conduit located in a wellbore and the walls of a wellbore (and/or a larger conduit in the wellbore), wherein the wellbore penetrates the subterranean formation. The extended-life cement composition may be allowed to set in the annular space to form an annular sheath of hardened cement. The extended-life cement composition may form a barrier that prevents the migration of fluids in the wellbore. The extended-life cement composition may also, for example, support the conduit in the wellbore.

In remedial cementing embodiments, an extended-life cement composition may be used, for example, in squeeze-cementing operations or in the placement of cement plugs. By way of example, the extended-life composition may be placed in a wellbore to plug an opening (e.g., a void or crack) in the formation, in a gravel pack, in the conduit, in the cement sheath, and/or between the cement sheath and the conduit (e.g., a microannulus).

Referring now to FIG. 1, the preparation of an extended-life cement composition in accordance with example embodiments will now be described. FIG. 1 illustrates a system 2 for the preparation of an extended-life cement composition and subsequent delivery of the composition to a wellbore in accordance with certain embodiments. As shown, the extended-life cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks. In some embodiments, a jet mixer may be used, for example, to continuously mix the lime/settable material with the water as it is being pumped to the wellbore. In extended-life embodiments, a re-circulating mixer and/or a batch mixer may be used to mix the extended-life cement composition, and the activator may be added to the mixer as a powder prior to pumping the cement composition downhole. Additionally, batch mixer type units for the slurry may be plumbed in line with a separate tank containing a cement set activator. The cement set activator may then be fed in-line with the slurry as it is pumped out of the mixing unit.

Figure 2:
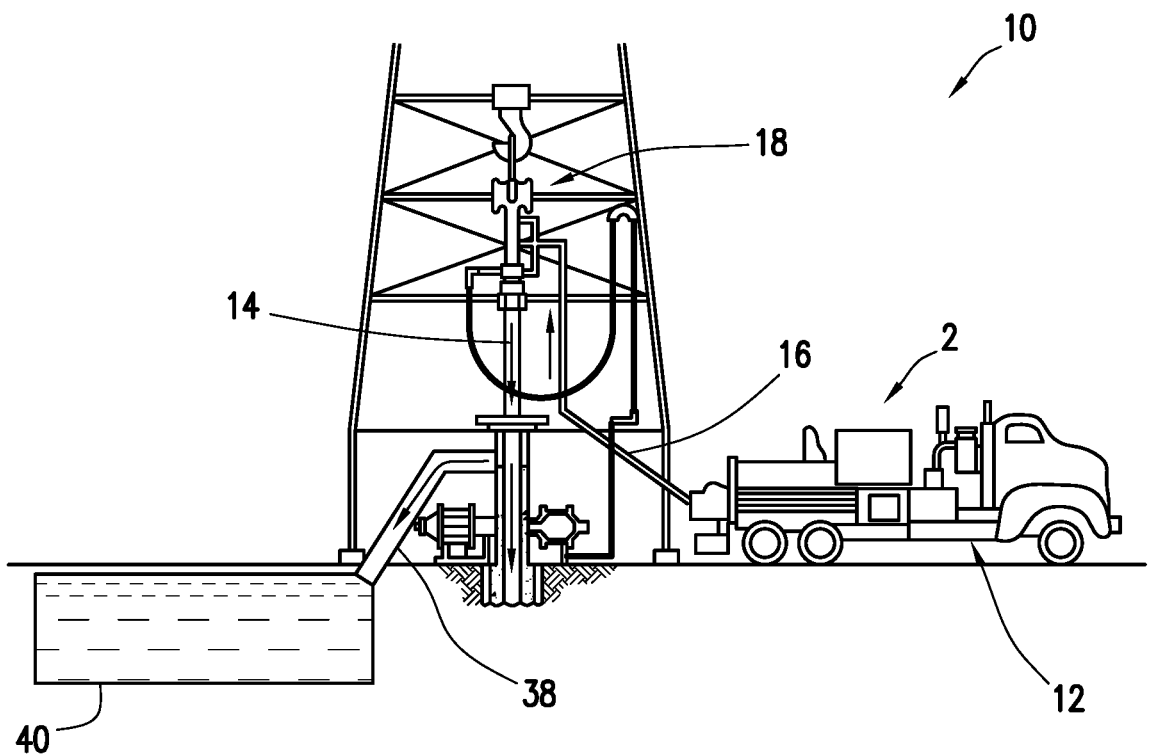
FIG. 2 illustrates surface equipment that may be used in the placement of an extended-life cement composition in a wellbore in accordance with certain embodiments.

An example technique for placing an extended-life cement composition into a subterranean formation will now be described with reference to FIGS. 2 and 3. FIG. 2 illustrates surface equipment 10 that may be used in placement of an extended-life cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1). The cementing unit 12 may pump an extended-life cement composition 14 through a feed pipe 16 and to a cementing head 18 which conveys the extended-life cement composition 14 downhole.

Figure 3:
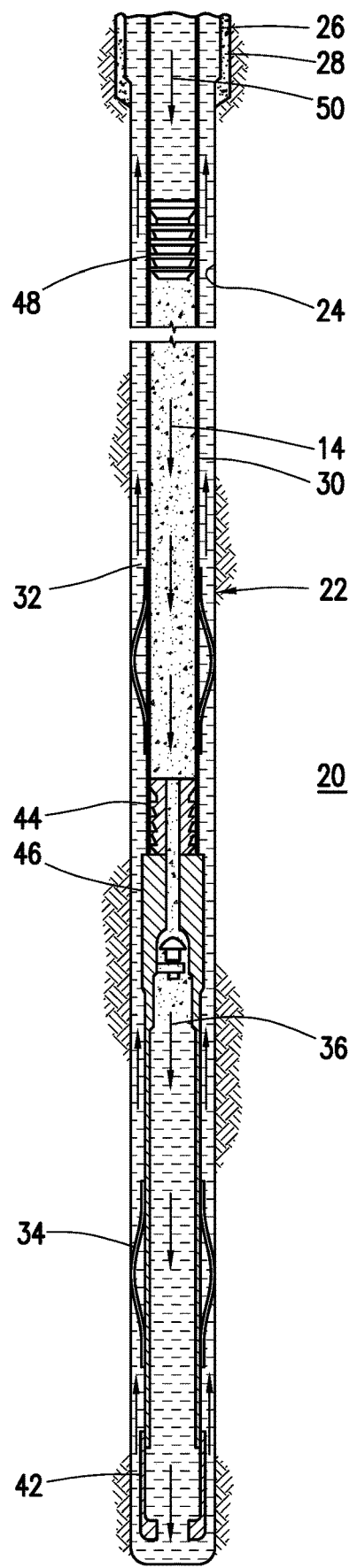
FIG. 3 illustrates the placement of an extended-life cement composition into a wellbore annulus in accordance with certain embodiments.

Turning now to FIG. 3, the extended-life cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, the extended-life cement composition 14 may be pumped down the interior of the casing 30. The extended-life cement composition 14 may be allowed to flow down the interior of the casing 30 through the casing shoe 42 at the bottom of the casing 30 and up around the casing 30 into the wellbore annulus 32. The extended-life cement composition 14 may be allowed to set in the wellbore annulus 32, for example, to form a cement sheath that supports and positions the casing 30 in the wellbore 22. While not illustrated, other techniques may also be utilized for introduction of the extended-life cement composition 14. By way of example, reverse circulation techniques may be used that include introducing the extended-life cement composition 14 into the subterranean formation 20 by way of the wellbore annulus 32 instead of through the casing 30.

As it is introduced, the extended-life cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2. Referring again to FIG. 3, a bottom plug 44 may be introduced into the wellbore 22 ahead of the extended-life cement composition 14, for example, to separate the extended-life cement composition 14 from the fluids 36 that may be inside the casing 30 prior to cementing. After the bottom plug 44 reaches the landing collar 46, a diaphragm or other suitable device should rupture to allow the extended-life cement composition 14 through the bottom plug 44. In FIG. 3, the bottom plug 44 is shown on the landing collar 46. In the illustrated embodiment, a top plug 48 may be introduced into the wellbore 22 behind the extended-life cement composition 14. The top plug 48 may separate the extended-life cement composition 14 from a displacement fluid 50 and also push the extended-life cement composition 14 through the bottom plug 44.

The following statements may describe certain embodiments of the disclosure but should be read to be limiting to any particular embodiment.

Statement 1. A method of cementing in a subterranean formation, comprising activating an extended-life cement composition by mixing at least the extended-life cement composition with a liquid activated pozzolan additive comprising a carrier fluid and an activated pozzolan, wherein the extended-life cement composition comprises water, pumice, hydrated lime, and a set retarder: introducing the extended-life cement composition into a subterranean formation; and allowing the extended-life cement composition to set to form a hardened mass in the subterranean formation.

Statement 2. The method of statement 1 wherein the pumice and the hydrated lime are present in a weight ratio of pumice to hydrated lime of about 10:1 to about 1:1.

Statement 3. The method of any of statements 1-2 wherein the set retarder comprises at least one retarder selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof.

Statement 4. The method of any of statements 1-3 wherein the activated pozzolan comprises cement hydration products deposited on a pozzolan, wherein the cement hydration products are reaction products of water and at least one cement selected from the group consisting of a Portland cement, a pozzolana cement, a gypsum cement, an alumina cement, a silica cements, and combinations thereof.

Statement 5. The method of any of statements 1-4 wherein the pozzolan is selected from the group consisting of fly ash, volcanic ash, tuft, pumicites, metakaolin, silica fume, slag, lime ash, perlite, silicate glass, soda-lime glass, soda-silica glass, borosilicate glass, aluminosilicate glass, and combinations thereof.

Statement 6. The method of any of statements 1-5 wherein the cement hydration products comprise microcrystalline and/or nanocrystalline calcium silica hydrate.

Statement 7. The method of any of statements 1-6 wherein cement hydration products comprise carbonate.

Statement 8. The method of any of statements 1-7 wherein the extended-life cement composition comprises at least one dispersant selected from the group consisting of a sulfonated-formaldehyde-based dispersant, a polycarboxylated ether dispersant, and any combination thereof.

Statement 9. The method of any of statements 1-8 wherein the set retarder comprises a phosphonic acid derivative, and wherein the extended-life cement composition further comprises a polycarboxylated ether dispersant.

Statement 10. The method of any of statements 1-9 wherein the extended-life cement composition has a pumice-to-hydrated-lime weight ratio of about 3:1 to about 5:1, wherein set retarder is present in an amount of about 0.01% to about 2% by weight of the pumice, and wherein the polycarboxylated ether dispersant is present in an amount of about 0.01% to about 2% by weight of the pumice.

Statement 11. The method of any of statements 1-10 further comprising storing the extended-life cement composition for a period of time of about 1 day or longer prior to the step of activating.

Statement 12. The method of any of statements 1-11 wherein the extended-life cement composition has a property of being able to remain in a pumpable fluid state for a time period of at least about 7 days prior to the step of activating.

Statement 13. A method of cementing in a subterranean formation, comprising: activating an extended-life cement composition, wherein the extended-life cement composition comprises water, an activated pozzolan, hydrated lime, and a set retarder: introducing the extended-life cement composition into a subterranean formation; and allowing the extended-life cement composition to set in the subterranean formation.

Statement 14. The method of statement 13 wherein the activated pozzolan comprises cement hydration products deposited on a pozzolan, wherein the cement hydration products are reaction products of water and at least one cement selected from the group consisting of a Portland cement, a pozzolana cement, a gypsum cement, an alumina cement, a silica cements, and combinations thereof.

Statement 15. The method of any of statements 12-14 wherein the pozzolan is selected from the group consisting of fly ash, volcanic ash, tuft, pumicites, metakaolin, silica fume, slag, lime ash, perlite, silicate glass, soda-lime glass, soda-silica glass, borosilicate glass, aluminosilicate glass, and combinations thereof.

Statement 16. The method of any of statements 12-15 wherein the cement hydration products comprise microcrystalline and/or nanocrystalline calcium silica hydrate.

Statement 17. The method of any of statements 12-16 wherein cement hydration products comprise carbonate.

Statement 18. The method of any of statements 12-17 wherein the set retarder comprises at least one retarder selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof.

Statement 19. The method of any of statements 12-18 further comprising storing the extended-life cement composition for a period of time of about 1 day or longer prior to the step of activating.

Statement 20. The method of any of statements 12-19 wherein the set retarder comprises a phosphonic acid derivative, and wherein the extended-life cement composition further comprises a polycarboxylated ether dispersant.

The exemplary extended-life cement compositions disclosed herein may directly or indirectly affect one or more components or pieces of equipment associated with the preparation, delivery, recapture, recycling, reuse, and/or disposal of the disclosed extended-life cement compositions. For example, the disclosed extended-life cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary extended-life cement compositions. The disclosed extended-life cement compositions may also directly or indirectly affect any transport or delivery equipment used to convey the extended-life cement compositions to a well site or downhole such as, for example, any transport vessels, conduits, pipelines, trucks, tubulars, and/or pipes used to compositionally move the extended-life cement compositions from one location to another, any pumps, compressors, or motors (e.g., topside or downhole) used to drive the extended-life cement compositions into motion, any valves or related joints used to regulate the pressure or flow rate of the extended-life cement compositions, and any sensors (i.e., pressure and temperature), gauges, and/or combinations thereof, and the like. The disclosed extended-life cement compositions may also directly or indirectly affect the various downhole equipment and tools that may come into contact with the extended-life cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

It should be understood that the compositions and methods are described in terms of "comprising." "containing." or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation, comprising:
    activating an extended-life cement composition by mixing at least the extended-life cement composition with a liquid activated pozzolan additive comprising a carrier fluid and an activated pozzolan, wherein the activated pozzolan comprises cement hydration products deposited on a pozzolan, and wherein the cement hydration products are reaction products of water and at least one cement, wherein the extended-life cement composition comprises water, pumice, hydrated lime, and a set retarder;
    introducing the extended-life cement composition into a subterranean formation; and
    allowing the extended-life cement composition to set to form a hardened mass in the subterranean formation.

2. The method of claim 1 wherein the pumice and the hydrated lime are present in a weight ratio of pumice to hydrated lime of about 10:1 to about 1:1.

3. The method of claim 1 wherein the set retarder comprises at least one retarder selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof.

4. The method of claim 1 wherein the at least one cement selected from the group consisting of a Portland cement, a pozzolana cement, a gypsum cement, an alumina cement, a silica cements, and combinations thereof.

5. The method of claim 4 wherein the pozzolan is selected from the group consisting of fly ash, volcanic ash, tuft, pumicites, metakaolin, silica fume, slag, lime ash, perlite, silicate glass, soda-lime glass, soda-silica glass, borosilicate glass, aluminosilicate glass, and combinations thereof.

6. The method of claim 4 wherein the cement hydration products comprise microcrystalline and/or nanocrystalline calcium silica hydrate.

7. The method of claim 4 wherein the cement hydration products comprise carbonate.

8. The method of claim 1 wherein the extended-life cement composition comprises at least one dispersant selected from the group consisting of a sulfonated-formaldehyde-based dispersant, a polycarboxylated ether dispersant, and any combination thereof.

9. The method of claim 1 wherein the set retarder comprises a phosphonic acid derivative, and wherein the extended-life cement composition further comprises a polycarboxylated ether dispersant.

10. The method of claim 9 wherein the extended-life cement composition has a pumice-to-hydrated-lime weight ratio of about 3:1 to about 5:1, wherein the set retarder is present in an amount of about 0.01% to about 2% by weight of the pumice, and wherein the polycarboxylated ether dispersant is present in an amount of about 0.01% to about 2% by weight of the pumice.

11. The method of claim 1 further comprising storing the extended-life cement composition for a period of time of about 1 day or longer prior to the step of activating.

12. The method of claim 1 wherein the extended-life cement composition has a property of being able to remain in a pumpable fluid state for a time period of at least about 7 days prior to the step of activating.

13. A method of cementing in a subterranean formation, comprising:
    activating an extended-life cement composition, wherein the extended-life cement composition comprises water, an activated pozzolan, hydrated lime, and a set retarder, wherein the activated pozzolan comprises cement hydration products deposited on a pozzolan, and wherein the cement hydration products are reaction products of water and at least one cement;
    introducing the extended-life cement composition into a subterranean formation; and
    allowing the extended-life cement composition to set to form a hardened mass in the subterranean formation.

14. The method of claim 13 wherein the activated pozzolan comprises cement hydration products deposited on a pozzolan, wherein the cement hydration products are reaction products of water and at least one cement selected from the group consisting of a Portland cement, a pozzolana cement, a gypsum cement, an alumina cement, a silica cements, and combinations thereof.

15. The method of claim 14 wherein the pozzolan is selected from the group consisting of fly ash, volcanic ash, tuft, pumicites, metakaolin, silica fume, slag, lime ash, perlite, silicate glass, soda-lime glass, soda-silica glass, borosilicate glass, aluminosilicate glass, and combinations thereof.

16. The method of claim 14 wherein the cement hydration products comprise microcrystalline and/or nanocrystalline calcium silica hydrate.

17. The method of claim 14 wherein the cement hydration products comprise carbonate.

18. The method of claim 14 wherein the set retarder comprises at least one retarder selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof.

19. The method of claim 14 further comprising storing the extended-life cement composition for a period of time of about 1 day or longer prior to the step of activating.

20. The method of claim 14 wherein the set retarder comprises a phosphonic acid derivative, and wherein the extended-life cement composition further comprises a polycarboxylated ether dispersant.

* * * * *